(12) United States Patent
Szrek et al.

(10) Patent No.: US 7,627,497 B2
(45) Date of Patent: Dec. 1, 2009

(54) METHOD FOR SELLING LOTTERY TICKETS FROM A POS TERMINAL

(76) Inventors: Walter Szrek, 60 Spencer Ave., East Greenwich, RI (US) 02818; Irena Szrek, 60 Spencer Ave., East Greenwich, RI (US) 02818

( * ) Notice: Subject to any disclaimer, the term of this patent is extended or adjusted under 35 U.S.C. 154(b) by 965 days.

(21) Appl. No.: 10/805,995

(22) Filed: Mar. 22, 2004

(65) Prior Publication Data

US 2004/0193464 A1 Sep. 30, 2004

Related U.S. Application Data

(60) Provisional application No. 60/457,800, filed on Mar. 26, 2003.

(51) Int. Cl.
*G07G 1/12* (2006.01)
(52) U.S. Cl. .......................... 705/24; 705/21
(58) Field of Classification Search ............. 705/24, 705/1; 463/17
See application file for complete search history.

(56) References Cited

U.S. PATENT DOCUMENTS

| | | | |
|---|---|---|---|
| 5,119,295 A * | 6/1992 | Kapur | 463/41 |
| 5,216,595 A * | 6/1993 | Protheroe | 463/42 |
| 5,239,165 A | 8/1993 | Novak | |
| 5,734,719 A * | 3/1998 | Tsevdos et al. | 700/234 |
| 5,772,510 A * | 6/1998 | Roberts | 463/17 |
| 6,241,606 B1 * | 6/2001 | Riendeau et al. | 463/17 |
| 6,360,209 B1 * | 3/2002 | Loeb et al. | 705/34 |
| 6,364,206 B1 * | 4/2002 | Keohane | 235/381 |
| 6,434,535 B1 * | 8/2002 | Kupka et al. | 705/24 |
| 6,505,170 B1 * | 1/2003 | Seifert et al. | 705/21 |
| 6,553,346 B1 * | 4/2003 | Walker et al. | 705/1 |
| 6,748,365 B1 * | 6/2004 | Quinlan et al. | 705/14 |

(Continued)

OTHER PUBLICATIONS

Loto-Quebec, Replay Option, Oct. 2002, http://loteries.loto-quebec.com/web/jsp/MainPage.jsp?Params=Y.US.80700.0.*

*Primary Examiner*—Matthew S Gart
*Assistant Examiner*—Oluseye Iwarere

(57) ABSTRACT

The present invention is a method and system for selling game of chance tickets at a point of sale cash register. The invention can be used for both lottery and other social games of chance tickets. An actual game ticket may be preprinted by the commercial printer, printed in the in-store kiosk, self-service terminal or on the standard gaming terminal. These preprinted tickets are not eligible to win prizes unless activated at the cash register. Tickets have a barcode or other means readable by a cash register or other equipment. The ticket is read at the cash register and activated. Acknowledgement of activation of the ticket is then printed on the cash register receipt. The main advantages of the proposed method are that using this approach does not require additional gaming equipment, such as a secure printer or a special gaming terminal at the cash register, it doesn't require any custom software changes in cash register software, it allows selling of tickets meeting the criteria of bearer's bond without the need of special printing media at the cash register, it allows for integrated accounting of gaming products and other products sold in the store and it allows for age control of ticket buyers. This approach allows for the sale of customer and computer generated lottery game selections at a cash register without any additional equipment in the lane or custom software in the cash register, with additional benefits of age control and integrated accounting.

23 Claims, 2 Drawing Sheets

U.S. PATENT DOCUMENTS

| | | | |
|---|---|---|---|
| 6,899,621 B2 | 5/2005 | Behm et al. | |
| 6,961,710 B1* | 11/2005 | Yanagisawa et al. | 705/24 |
| 6,965,869 B1* | 11/2005 | Tomita et al. | 705/14 |
| 6,991,541 B2* | 1/2006 | Lind et al. | 463/17 |
| 7,024,375 B2* | 4/2006 | Chau et al. | 705/24 |
| 7,182,255 B2 | 2/2007 | Mollett et al. | |
| 2001/0029487 A1* | 10/2001 | Kwon | 705/41 |
| 2002/0111214 A1* | 8/2002 | Lind et al. | 463/42 |
| 2002/0119817 A1* | 8/2002 | Behm et al. | 463/17 |
| 2004/0049427 A1* | 3/2004 | Tami et al. | 705/24 |
| 2004/0060064 A1* | 3/2004 | Poli | 725/61 |
| 2005/0075938 A1* | 4/2005 | Mukai et al. | 705/24 |
| 2005/0080681 A1* | 4/2005 | Ohnishi | 705/24 |
| 2005/0262338 A1 | 11/2005 | Irwin, Jr. | |
| 2007/0010311 A1* | 1/2007 | Irwin et al. | 463/17 |
| 2007/0233572 A1* | 10/2007 | Knowles et al. | 705/22 |
| 2008/0119284 A1* | 5/2008 | Luciano et al. | 463/42 |

* cited by examiner

300
Preprinted Ticket

400
Cash Register
Receipt Figure 4

METHOD FOR SELLING LOTTERY TICKETS FROM A POS TERMINAL

CROSS-REFERENCE TO RELATED APPLICATIONS

This application claims the benefit of U.S. Provisional Application Ser. No. 60/457,800, filed Mar. 26, 2003.

BACKGROUND OF THE INVENTION

The present invention relates to the lottery industry. More specifically, it relates to printing and authenticating tickets used for the administration and operation of the lottery system and process. The goal of the present invention is to enable the secure sale of lottery tickets at general retail point of sale (POS) checkout points, such as standard cash registers, and other similar devices.

Lotteries and other gaming organizations continuously look for ways to increase their lottery ticket sales. This can be achieved by widening their market presence and improving ticket sale experience for the public. Traditionally lottery tickets have been sold at the dedicated lottery terminals, usually located in small convenience stores and in supermarkets which is typically a single terminal at a service desk. There have been market studies and small system installations done with lottery tickets sold in supermarket lanes via in-lane terminals. While the concept of sales in supermarket lanes has been well received, financially it has not proven successful, partly due to relatively high cost of in-lane lottery terminals compared to the levels of sales per lane. Availability of lottery sales in every supermarket lane is very attractive to consumers. Ideally one would want to allow for sales in lanes w/o any additional lottery equipment required in lane and with minimal additional overall cost.

To address this, there is consideration in the industry to effectuate lottery ticket sales by existing store cash registers. Following traditional lottery sales model would require cash register to be equipped with custom lottery application for processing lottery transactions and printing lottery tickets. This traditional lottery sales model refers to sales performed in a similar fashion to sales via a dedicated lottery terminal where a lottery agent (or player at a kiosk or player operated terminal) enters game selections via keyboard or bet slip, a terminal sends a lottery transaction to the host system, where transaction is recorded, the terminal obtains a transaction serial number, and a lottery ticket is produced.

However, this traditional lottery sales model introduces many problems mainly related to lottery ticket printing requirements and lottery system controls.

For example, the wide variety of cash registers hardware and software make it difficult if not impossible to develop an effective solution. The lack of Lottery control over cash register hardware and software could lead to security problems and serious lottery system operation issues. Also, regular cash register paper stock does not meet requirements for lottery tickets because it is insecure, non-durable and non-uniform from manufacturer to manufacturer. There is also a lack of Lottery branding when the ticket is printed directly on cash register receipt.

In view of the foregoing, it is generally known that there are many problems related to the secure sales and printing of lottery tickets at common POS locations using standard equipment and a traditional sales model. Therefore, in order to pursue lottery sales at cash registers, it is necessary to address the secure ticket sales and printing problem. The present invention enables such locations to be used to sell such lottery tickets.

It is understood in the industry that a lottery ticket is considered a bearer's bond because it constitutes a proof of a valid transaction and of the bet wagered. Lottery tickets usually contain information about wagered bet, date when ticket was purchased and date of game draw, selling entity information (agent and terminal number) and a unique transaction identifier, usually called serial number. To avoid problems with falsified tickets, some lottery vendors print special security codes on lottery tickets. If there is a question about authenticity of a ticket, this code may be used to verify it. This technique is designed to prevent both internal and external fraud. In typical implementations, this security code carries some secret information that cannot be recreated by the player or game provider but can be verified by security or audit office.

One of the issues related to selling lottery tickets in a supermarket or retail store is the lack of integrated accounting. As lottery tickets are sold on independent terminals from cash registers, lottery sales are kept separate from the rest of the sold merchandise, which is a big inconvenience for the stores.

Currently sales of instant tickets are not integrated with both store sales and game provider. The "Instant ticket" is a special game of chance where the ticket is predetermined to be a winner or loser. These tickets are printed by specialized commercial printers/vendors and distributed to agent sales locations. A customer, after buying an instant ticket, physically alters it to reveal if it is a losing or a winning ticket. While sales of specific instant ticket may not be always important from the store point of view, it is important from the game provider view to obtain accurate and detailed instant ticket sales information.

Stores sell merchandise at the cash register requiring some type of activation. The merchandise would not be functional till activated. For example, phone cards do not work unless they are sold and activated through the cash register in the store. In this case the sale of the card would be registered and authorization request, including phone card identifier, would be sent to the card issuer or his agent for the phone card activation. From cashier's point of view the sale of such phone card is similar to sales of any other merchandise, and at the same time the phone card is individually registered for the activation. In summary, the phone card was not functional, unless initially properly registered/activated through the cash register. Phone card registration may happen by sending registration request directly from the cash register to the phone service provider or indirectly via the store back office, which may be connected to store chain network. Authorization may actually happen via direct or indirect connection in the store or store chain network to the phone card provider or his agent.

In addition to agent/cashier selling tickets at the specialized lottery terminals, lottery tickets are also sold in some jurisdictions at self-operated lottery terminals or kiosks, equipped with bill acceptors for payment. Many lotteries hesitate to introduce self operated terminals since they cannot well enforce age control.

In view of the foregoing there is a demand for the ability to sell lottery tickets at cash registers. There is a demand for a lottery ticket system that can quickly and easily prove ticket authenticity. There is a particular demand for the ability to sell both player chosen and computer generated tickets. There also needs to be a mechanism and method for controlling the age of players. There is also a demand for a system that has integrated accounting of the lottery sales with other cash register transactions. There is a further demand for a lottery system to integration of sales of instant tickets with other cash register transactions and with game provider transactions.

SUMMARY OF THE INVENTION

The present invention preserves the advantages of prior art of methods for selling lottery tickets. In addition, the improved method of the present invention provides new advantages not found in currently known methods and overcomes many disadvantages of such currently available methods for selling lottery tickets at the cash registers and devices associated therewith.

To carry out the present invention, it is assumed that an environment is provided where the cash register is capable of communicating with the game provider system (directly or indirectly) and the game provider system (or some other system on behalf of game provider system) is authorizing cash register's lottery transactions. These transactions could be stored in game provider system or in another system.

The novel approach according to the present invention is known under the trademark CHECKOUT PLAY. In accordance with the novel method of the present invention, instead of printing the lottery ticket, from a legitimate and authorized game provider, on the cash register, the ticket is preprinted (printed ahead of the ticket sale by a commercial printer capable of printing lottery tickets or on a wagering terminal, self-service lottery terminal, or at a lottery kiosk).

The ticket can be preprinted according to player's selection, his favorite bet, or as a computer generated selections (quick pick). Tickets from commercial printer could be enveloped or covered by latex. From the player's point of view, the commercial printer's tickets are computer generated selections. For traditional lottery games the number of computer generated bets varies between 20% and 50%. In an alternative embodiment of the present invention, the ticket can be activated more than once.

The ticket of the present invention does not have a play value until it is activated at the cash register or the lottery terminal. It may be sold or provided for free, with payment collected at activation time. Activation is done by scanning the ticket barcode or by entering the ticket identifier from the keyboard. The cash register, instead of printing a lottery ticket, will activate a ticket for the specific draw and print an activation receipt.

All tickets are "preloaded" in the game provider's system, and during ticket activation, the game provider system merely recognizes from the ticket identifier what transaction is activated (e.g. lotto, 6 specific boards known to the system and the player). In some embodiments ticket identifier may indicate, in an algorithmic fashion, what transaction was being activated and game provider system would "load" this transaction. The game provider verifies if this was a "legal" transaction and sends activation receipt info to the cash register. Because lottery ticket is preprinted in a secure fashion, and only an activation receipt for the transaction is printed at cash register, the ticket could be regarded as secure.

The invention is generally directed to the novel and unique process of selling tickets at the cash registers. The process is similar to a model following selling phone cards at the cash register. In this case the lottery ticket is preprinted at the lottery terminal, stand-alone kiosk or by a commercial printer. Preprinted tickets from self-service terminals, kiosks, or on the regular lottery terminals are created by the transactions initiated from these devices, logged and processed on the game provider system and then printed on these devices. Preprinted tickets from a commercial printer are also coming indirectly from the game provider. The game provider will either provide bets information to the commercial printer or agree on the method of generation of selections. This would be in form of data (file, data base, network, disk, tape or any other means) or in form of the algorithmic method of generation of the bets.

Each preprinted ticket has a barcode uniquely identifying it and allowing play data identification algorithmically or via some database, file or memory look-up. In addition, the ticket may contain some extra security codes, so the ticket authenticity may be independently verified. Security data is designed in a way that the lottery provider is able to verify the correctness of this data to prove authenticity of the ticket. For example, commercial printer could encrypt all play data by the key only known to him and print the first few digits of the encrypted data. The lottery security office could receive the key by independent means, encrypt all play data again and verify the security data.

The ticket of the present invention does not have a play value unless it is activated. This activation could be done on the cash register by scanning ticket bar code or entering the ticket identifier manually. After the ticket identifier is obtained, an authorization request is sent to the game provider either directly from the cash register or indirectly via the store "back office".

In accordance with the present invention, a preprinted ticket is used as a bearer's bond, only once the ticket is activated. The preprinted ticket is not eligible to win prizes unless payment and activation occurs. A cash register receipt is used by the ticket holder to prove that the ticket was activated. A register receipt preferably contains the preprinted ticket identifier and possibly some other authentication code and security codes.

This approach allows selling lottery product as any other in-store merchandise where the preprinted ticket barcode is scanned by the cash register, price information is retrieved either from the ticket barcode or from the store back office or from the game provider during ticket activation.

The barcode on the preprinted ticket should be compatible with barcode technology commonly used at the cash registers. It could be EAN-13 plus 5, 2 out of 5, EAN-128 or some other standardized one or two dimensional barcode. The information in the barcode should contain a ticket identifier. It may contain other information such as lottery product code, ticket price or other data. Standard barcodes, such as UPC, have usually a few well defined areas. One of them is manufacturer's ID and another is product ID. The invention allows for using non-standard format of the standardized barcode as long as this format could be easily understood by the cash registers, however standard format is preferred. In some embodiments, where standard lottery terminals are not capable of reading cash register style barcode, preprinted tickets may contain two barcodes: cash register one and the other readable by the lottery terminals.

After the barcode information has been scanned, cash register originates a transaction to the game provider requesting ticket activation. This is usually done by requesting the product type and price. This request is usually transformed into an activation request by the store back office software. The request is then sent to the game provider, who authorizes the activation and sends back lottery product description, price, and activation receipt identifier, usually with some security code. The store back office may append its own security code. On the cash register receipt, ticket price, product type, preprinted ticket identifier, activation identifier and security codes may be printed.

Depending on the implementation, preprinted lottery ticket activation transaction may be just another product type and may be integrated with other merchandise sales and receipt or it may be a separate cash register transaction and its own receipt.

In some embodiments, it may be necessary for cash register to initiate other lottery related transactions, besides activation. For example, the customer may decide not to buy some items after they are checked. This would apply also to lottery tickets, so there will be a need for a cancellation for tickets that were activated and not paid for. This may be done in many different ways, for example, an "undo" or "cancel" transaction may be initiated for such a ticket, or deactivation for multiple tickets may be sent to the game provider for reconciliation. In some embodiments, ticket cancellations may be done on the standard lottery terminals.

In some embodiments, for tickets that were already activated and took part in the drawing, the cash register may be used to validate winners and possibly to get authorization for payment for the winning tickets.

The present invention completely obviates the need for the local printing of lottery tickets at the point of sale. Only a receipt of lottery transaction is printed locally at cash register which does not need to be printed in as secure fashion as a lottery ticket. The present invention can also be used for selling tickets from other devices than cash register.

Of course, it is possible that the lottery tickets may be printed securely directly at the point of sale, kiosk location, lottery terminal, commercial printer or any other secure printer location. In accordance with the present invention, such securely printed tickets can then be activated and used for the next lottery draw.

BRIEF DESCRIPTION OF THE DRAWINGS

The novel features which are characteristic of the present invention are set forth in the appended claims. However, the invention's preferred embodiments, together with further objects and attendant advantages will be best understood by reference to the following detailed description taken in connection with the accompanying drawings in which:

FIG. 4 is diagrammatic view of activation information printed on the cash register receipt.

DETAILED DESCRIPTION OF THE PREFERRED EMBODIMENT

Figure 1:
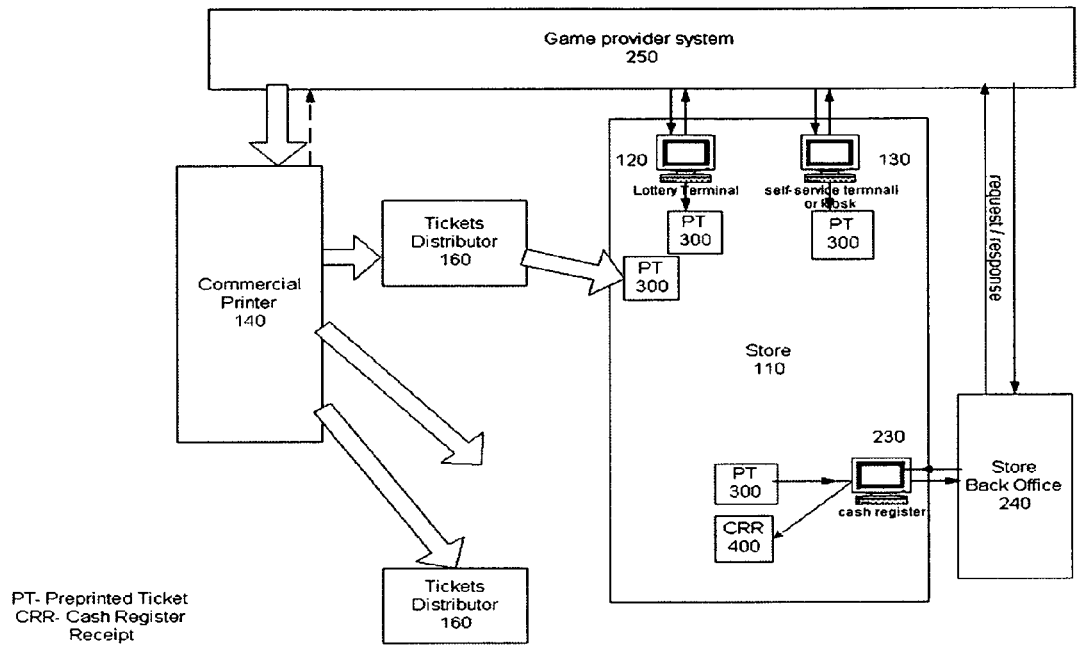
FIG. 1 is a diagrammatic view of the logical process of selling lottery tickets according to this invention.

Referring first to FIG. 1, a flowchart illustrating the logical process 100 of selling lottery tickets according to this invention and in accordance with the preferred embodiment the present invention is shown. Preprinted tickets (PT) 300 is preferably preprinted by a commercial printer 140 or in the lottery kiosk 130, self service terminal 130 or regular lottery terminals 120. These tickets 300 will not be eligible in the draw until activated.

Figure 3:
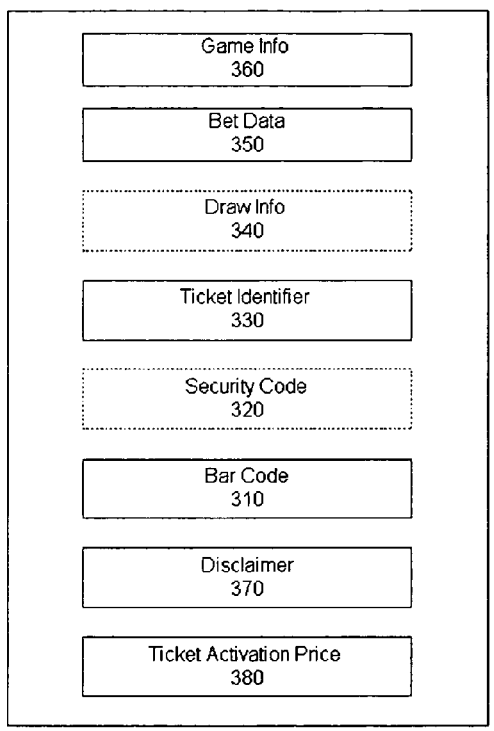
FIG. 3 is diagrammatic view of the information printed on the preprinted ticket.
Figure 3:
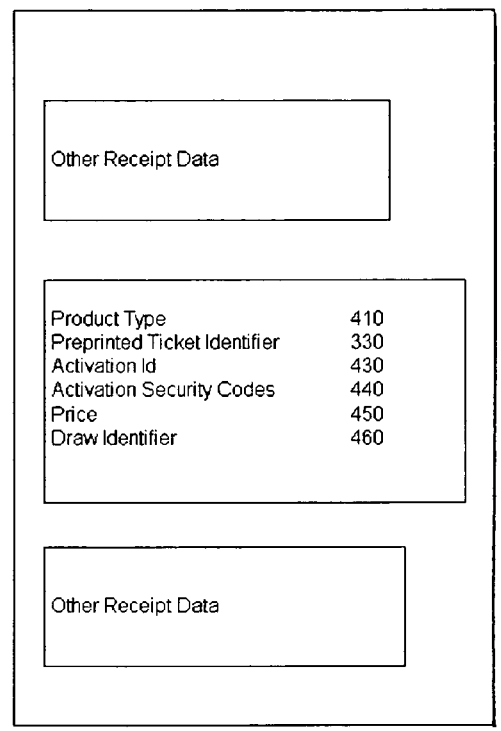

In FIG. 3, a diagrammatic representation of a lottery ticket 300 is shown. Each ticket 300 preferably has a disclaimer 370 printed such as ticket 300 will not be eligible in the draws until activated or the like. The preprinted ticket 300 contains many elements of a traditional lottery ticket, including bet selections 350, unique ticket identifier 330, barcode 310 that includes ticket identifier 330, duration for number of eligible draws (if activated) 340, ticket price or ticket activation price 380 (as opposed to ticket price on regular ticket). In addition, the ticket 300 preferably includes a security code 320 printed directly on the ticket to allow verification of play data and/or ticket authenticity plus possibly some other elements.

Each ticket 300 preferably has a barcode 310 that could be scanned on the cash register, with information allowing identifying this barcode as lottery ticket 300 and uniquely identifying the ticket 330. In a preferred embodiment, barcode 310 is one of the supported standard barcodes. The fixed part of the barcode should indicate the product type; the variable part of the barcode should contain ticket identifier 330. Preferred barcodes are most economical in terms of amount of embedded information per state of the art of commonly accepted barcodes. To ensure correctness of ticket identifier 330, there may be an integrity check embedded into it. In some environments, one single barcode 310 may not be readable by all POS devices and by lottery terminals. In this case more than one bar code may be needed to be printed on the ticket 300. In a preferred embodiment, regular lottery terminals 120, if deployed in the jurisdiction, should be also able to read this barcode 310.

A lottery player may choose his own selection and have it printed at the kiosk 130 or self-service terminal 130, or he may pick up a ticket 300 printed by the commercial printer 140.

Figure 2:
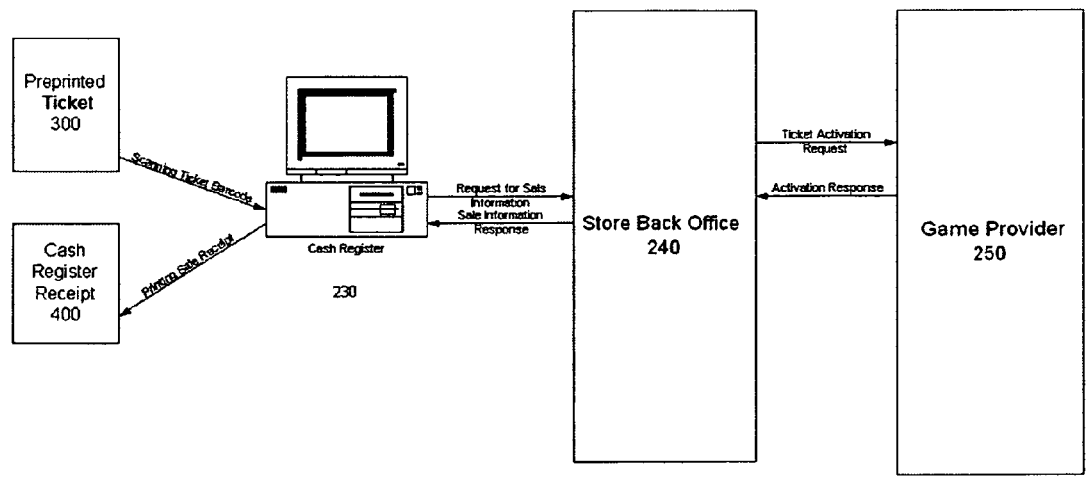
FIG. 2 is a diagrammatic view of the logical process of activation of lottery ticket via cash register.

In accordance with the method of the present invention, the logical process 200 of activation of lottery ticket 300 via a cash register 230 is shown in FIG. 2. The store clerk scans ticket 300 like any other product. Normally when a barcode 310 is scanned for any merchandise, the checkout register 230 application looks up the merchandise price in database or checks the price by using some algorithmic interface. In case of the ticket 300 of the present invention, this request will be transformed into transactional request to the game provider 250 who verifies if this Checkout Play 300 was already activated. If not, it will activate this ticket by marking a status or state of corresponding identifier or record in the computer memory or on the computer disk or it may even create a record with the corresponding identifier. If the ticket 300 was already activated and ticket 300 did not participate yet in the lottery drawing, the transaction would be denied.

If the ticket was activated and it has already participated in a drawing several different approaches are possible. In the preferred embodiment game provider system could check if the ticket 300 is a winner and send information back, without actual winner payment authorization, in another embodiment it could say the ticket is a winner and authorize winner payment, or in another embodiment it could just not authorize authentication of the transaction. In some embodiments the Checkout Play ticket could be activated again, and the winning prizes for these tickets would be rolled together.

Once the ticket 300 is activated, product type 410 (sale of lottery ticket, or a sale of ticket for the specific game or game event), the original preprinted ticket identifier 330, activation identifier 430, security codes 440, an activation price 450 and valid draw identifier 460, such as draw number or draw time, are printed on cash register receipt. In some embodiments, the game provider 250 time could be printed on the cash receipt 400.

For claiming or payment of lottery prize preprinted ticket 300 needs to be presented along with the cash register receipt which is illustrated diagrammatically in FIG. 4. In a case of any dispute, the cash register receipt 400 with ticket activation information such as price 450, the activation/authorization code needs to be presented 430. Cash register receipt 400 will allow identifying the activation transaction. In addition, security codes 440 allow authentication of cash register receipt and preprinted tickets 300 security code 320 allow authentication of the preprinted ticket 300.

In preferred embodiment, the store clerk is able to process other types of lottery transactions. Notably, nullification of the activation may be provided if the activation was not paid for, and payments for the winning tickets may be offered. Similarly, instant tickets sales could be handled at POS with instant ticket ID registration to enable instant ticket sales control and integrated accounting.

In the preferred embodiment, the preprinted ticket identifier 330 is known to the game provider 250. The game provider 250 either issues a processing request for preprinted ticket 300 or it agrees with commercial printer 140 on methods of its assignment and relation between ticket identifier 330 and data bet on the ticket 350 (via algorithm or some database or file information). In some embodiments of this invention, the preprinted ticket identifier 330 on the self-service terminal 130 or kiosk 130 could be constructed in a way that part of ticket identifier 330 could correspond to the bet combination 350 chosen by the players.

For example, in a lotto game 6 of 49, each combination corresponds to one of the numbers from 1 to 13,983,816, e.g. combination 1, 2, 3, 4, 5, 6 could correspond to 1 and 1, 2, 3, 4, 5, 7 to 2 etc. In this case, the game provider system may learn bet combination from the ticket identifier and authorize this bet. Another part of ticket identifier could contain some element making this ticket unique, such as issued tickets sequence counter on said self-service terminal 130 or kiosk 130. Such an approach may introduce some limitations i.e. limit number of bets played on a single preprinted ticket 300, but in exchange offer some advantages. E.g. this type of ticket identifier assignment allows printing customer selected wagers on tickets 300 on self-service terminals 130 and in kiosks 130 without game provider 250 connectivity.

It would be appreciated by those skilled in the art that various changes and modifications can be made to the illustrated embodiments without departing from the spirit of the present invention. All such modifications and changes are intended to be covered by the accompanying claims.

What is claimed is:

1. A method of selling a non-instant lottery ticket to a player at a point of sale terminal for participation in a game event offered by a game provider, comprising the steps of:
   receiving, from a player at the point of sale terminal, data identified by a first machine-readable means printed on a first ticket for participation in a game event, the first ticket having the first machine-readable means printed thereon by a device not connected to the point of sale terminal and prior to the receiving and responsive to the player selecting one or more bet combinations, the first machine-readable means corresponding to the bet combinations selected by the player, the point of sale terminal being unable to read data identified by a second machine-readable means printed on a second ticket by a standard lottery terminal for participating in the game event;
   activating, after receiving the data identified by the first machine-readable means, the first ticket to participate in the game event via the point of sale terminal, the first ticket having no play value until the activation of the first ticket;
   permitting the first ticket to participate in the game event;
   printing a receipt with indicia thereon after activating the first ticket; the indicia including proof of payment and activation of the first ticket; and
   receiving payment from the player.

2. The method of claim 1, wherein the first machine-readable means is a bar code.

3. The method of claim 1, wherein the first machine-readable means identifies a specific lottery product.

4. The method of claim 1, wherein the first machine-readable means or a part of the first machine-readable means identifies a specific game provider identifier.

5. The method of claim 1, wherein the first machine-readable means includes a ticket security authentication code.

6. The method of claim 1, wherein the device is selected from the group consisting of a commercial printer, a self-service terminal, a lottery kiosk and a standard lottery terminal.

7. The method of claim 1, wherein the second machine readable means includes multiple barcodes.

8. The method of claim 1, wherein the indicia on the receipt includes activation price.

9. The method of claim 1, wherein the indicia on the receipt includes an activation transaction identifier.

10. The method of claim 1, wherein the indicia on the receipt includes a security authentication code.

11. The method of claim 10, further comprising the step of: generating the security authentication code using an algorithm and secret data.

12. The method of claim 11, wherein the algorithm is a standard encryption algorithm.

13. The method of claim 11, wherein the step of generating the security authentication code uses information available only to a game provider.

14. The method of claim 11, wherein the step of generating the security authentication code uses information derived only from the information available on the receipt.

15. The method of claim 11, wherein the step of generating the security authentication code uses information derived only from a store back office system.

16. The method of claim 11, wherein the step of generating the security authentication code uses information derived partially from the game provider and partially from the indicia on the receipt.

17. The method of claim 1, further comprising the step of: sending detailed ticket information of the first ticket to the game provider for registration of sale from the point sale terminal.

18. The method of claim 1, further comprising the step of: assigning a unique ticket identifier to the first ticket in a way that part of the identifier algorithmically corresponds to a combination bet.

19. The method of claim 1, further comprising the step of: verifying a player's age prior to activating the first ticket to participate in the game event.

20. The method of claim 1, wherein the first ticket represents a bearer's bond only after the activation of the first ticket.

21. The method of claim 1, wherein the player selects the bet combinations at the device and receives the first ticket from the device with the first machine-readable means printed thereon, and wherein the activation of the first ticket comprises activating, at the point-of-sale terminal, the data identified by the first machine-readable means.

22. The method of claim 1, wherein the received data corresponds to the bet combinations on the first ticket.

23. The method of claim 1, wherein the indicia printed on the first receipt includes a ticket price of the first ticket.

* * * * *

UNITED STATES PATENT AND TRADEMARK OFFICE
CERTIFICATE OF CORRECTION

PATENT NO. : 7,627,497 B2
APPLICATION NO. : 10/805995
DATED : December 1, 2009
INVENTOR(S) : Szrek et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1206 days.

Signed and Sealed this

Twenty-first Day of December, 2010

David J. Kappos
*Director of the United States Patent and Trademark Office*